US009357840B2

(12) United States Patent
Davis

(10) Patent No.: US 9,357,840 B2
(45) Date of Patent: Jun. 7, 2016

(54) SUPPORTING CONSUMER PRODUCTS

(71) Applicant: ADCO Industries—Technologies, L.P., Dallas, TX (US)

(72) Inventor: Raymond E. Davis, Heath, TX (US)

(73) Assignee: ADCO Industries—Technologies, L.P., Dallas, TX (US)

(*) Notice: Subject to any disclaimer, the term of this patent is extended or adjusted under 35 U.S.C. 154(b) by 0 days.

(21) Appl. No.: 14/448,902

(22) Filed: Jul. 31, 2014

(65) Prior Publication Data

US 2016/0029786 A1 Feb. 4, 2016

(51) Int. Cl.
| *A47B 57/04* | (2006.01) |
| *A47B 57/34* | (2006.01) |
| *A47B 57/50* | (2006.01) |
| *A47B 47/00* | (2006.01) |

(Continued)

(52) U.S. Cl.
CPC .............. *A47B 57/04* (2013.01); *A47B 47/0083* (2013.01); *A47B 57/20* (2013.01); *A47B 57/34* (2013.01); *A47B 57/50* (2013.01); *A47F 5/101* (2013.01); *A47B 91/00* (2013.01)

(58) Field of Classification Search
CPC ........ A47B 57/04; A47B 57/34; A47B 57/10; A47B 57/00; A47B 47/0083; A47B 57/40; A47B 57/48; A47B 57/482; A47B 57/08; A47B 57/485; A47B 91/00; A47B 57/50; A47B 57/20; A47F 5/101; A47F 1/12
USPC ............. 211/187, 153, 59.2, 192, 191, 90.02, 211/190, 207, 208; 108/107, 146
See application file for complete search history.

(56) References Cited

U.S. PATENT DOCUMENTS 869,491 A * 10/1907 Hurteau ..................... 108/107
984,857 A 2/1911 Schuftan
(Continued)

FOREIGN PATENT DOCUMENTS

| DE | 3925676 A1 | 2/1991 |
| EP | 438180 A2 | 7/1991 |

(Continued)

OTHER PUBLICATIONS

POWERSHELF™ Product Comparison Guide, "Evaluation: Present Shelving Systems vs. Power Shelf™ System Solution,"[online],<http://www.adcoindustries.com/Powershelf%20PDFhtm>, retrieved Feb. 8, 2008, 2 pages.

(Continued)

*Primary Examiner* — Joshua Rodden
*Assistant Examiner* — Hiwot Tefera
(74) *Attorney, Agent, or Firm* — Fish & Richardson P.C.

(57) ABSTRACT

A shelving apparatus includes a frame structure formed with vertical members and horizontal members and a shelf adjustable between positions and supported, at each position, by the vertical members. The vertical members and horizontal members define a volume therebetween, and each of the vertical members include notches formed on a vertical surface of the vertical member. The shelf includes a frame; a product surface coupled with the frame; a first rod coupled to the frame and insertable into at least a portion of a respective notch of one of the vertical members; and a second rod coupled to the frame and insertable into at least a portion of a respective notch of another of the vertical members. The second rod is forcibly biased, by a biasing member coupled with the frame, against at least one of the vertical members.

26 Claims, 11 Drawing Sheets

(51) Int. Cl.
*A47B 57/20* (2006.01)
*A47F 5/10* (2006.01)
*A47B 91/00* (2006.01)

(56) References Cited

U.S. PATENT DOCUMENTS

| | | | | |
|---|---|---|---|---|
| 1,411,260 | A * | 4/1922 | Baker et al. | 108/107 |
| 1,554,011 | A * | 9/1925 | Lehman | 108/107 |
| 1,699,710 | A | 1/1929 | Pearlman | |
| 1,745,784 | A * | 2/1930 | Davis | 211/182 |
| 1,750,696 | A * | 3/1930 | Vance | 108/107 |
| 1,778,075 | A * | 10/1930 | Harris | A47B 57/20 |
| | | | | 211/153 |
| 2,555,254 | A | 5/1951 | Stebbins | |
| 2,841,459 | A | 7/1958 | Sharpe | |
| 3,040,904 | A * | 6/1962 | St Amour | A47B 57/04 |
| | | | | 108/1 |
| 3,080,980 | A | 3/1963 | William | |
| 3,115,254 | A * | 12/1963 | Dowdall | A47B 57/04 |
| | | | | 108/108 |
| 3,144,945 | A * | 8/1964 | Seiz | 211/192 |
| 3,151,576 | A | 10/1964 | Patterson | |
| 3,172,715 | A | 3/1965 | Powder | |
| 3,266,635 | A * | 8/1966 | McConnell | 211/191 |
| 3,316,044 | A | 4/1967 | Carbary | |
| 3,330,229 | A * | 7/1967 | Ferdinand et al. | 108/107 |
| 3,337,283 | A | 8/1967 | Schlenkert | |
| 3,570,679 | A * | 3/1971 | Edson | 211/47 |
| 3,570,798 | A | 3/1971 | Squibb | |
| 3,667,617 | A * | 6/1972 | Cohn | A47F 5/12 |
| | | | | 211/126.1 |
| 3,885,846 | A * | 5/1975 | Chuang | A47B 57/482 |
| | | | | 108/110 |
| 3,967,734 | A | 7/1976 | Morgan | |
| 3,982,801 | A | 9/1976 | Heidorn | |
| 4,026,222 | A | 5/1977 | Mueller | |
| 4,098,480 | A | 7/1978 | Neumann | |
| 4,169,416 | A | 10/1979 | Haynes | |
| 4,217,010 | A | 8/1980 | Webb | |
| 4,221,443 | A | 9/1980 | Heaney | |
| 4,275,665 | A | 6/1981 | Silverman | |
| 4,329,928 | A | 5/1982 | Shaw | |
| 4,519,508 | A | 5/1985 | Gullett | |
| 4,593,823 | A | 6/1986 | Fershko | |
| 4,603,782 | A * | 8/1986 | Fenwick | 211/153 |
| 4,730,738 | A | 3/1988 | Bartus | |
| 4,880,285 | A | 11/1989 | Brinkers | |
| 4,972,783 | A * | 11/1990 | Crissman et al. | 108/107 |
| 5,117,986 | A | 6/1992 | Lin | |
| 5,119,944 | A | 6/1992 | Milton | |
| 5,199,778 | A | 4/1993 | Aoki | |
| 5,249,858 | A | 10/1993 | Nusser | |
| 5,279,430 | A * | 1/1994 | Benton | 211/151 |
| 5,333,746 | A | 8/1994 | Bustos | |
| 5,349,909 | A * | 9/1994 | Smit | F16B 12/14 |
| | | | | 108/107 |
| 5,490,600 | A | 2/1996 | Bustos | |
| 5,577,623 | A | 11/1996 | Bustos | |
| 5,607,068 | A | 3/1997 | Coretti | |
| 5,645,182 | A | 7/1997 | Miller | |
| 5,695,075 | A | 12/1997 | Flum | |
| 5,706,956 | A | 1/1998 | Headrick | |
| 5,738,019 | A | 4/1998 | Parker | |
| 5,762,213 | A * | 6/1998 | Heneveld, Sr. | A47B 57/485 |
| | | | | 108/109 |
| 5,765,702 | A | 6/1998 | Bustos | |
| 5,799,588 | A | 9/1998 | Engel | |
| 5,806,689 | A | 9/1998 | Mays | |
| 5,913,584 | A | 6/1999 | Swindell | |
| 6,021,908 | A | 2/2000 | Mathews | |
| 6,024,025 | A | 2/2000 | Koch | |
| 6,044,983 | A | 4/2000 | Hall | |
| 6,065,821 | A | 5/2000 | Anderson | |
| 6,132,158 | A | 10/2000 | Pfeiffer | |
| 6,158,600 | A | 12/2000 | Ferrucci | |
| 6,234,328 | B1 | 5/2001 | Mason | |
| 6,302,282 | B1 | 10/2001 | Gay | |
| 6,332,547 | B1 * | 12/2001 | Shaw et al. | 211/59.2 |
| 6,352,164 | B1 * | 3/2002 | Hyatte et al. | 211/192 |
| 6,431,378 | B1 | 8/2002 | Lewis | |
| 6,443,319 | B1 | 9/2002 | Sander | |
| 6,505,900 | B2 | 1/2003 | Frederick | |
| 6,726,039 | B2 | 4/2004 | Boron | |
| 6,729,484 | B2 * | 5/2004 | Sparkowski | A47F 5/137 |
| | | | | 211/134 |
| 6,843,382 | B2 | 1/2005 | Kanouchi | |
| 6,948,900 | B1 * | 9/2005 | Neuman | B62B 3/002 |
| | | | | 193/35 R |
| 6,962,116 | B2 | 11/2005 | Bienick | |
| 6,978,906 | B2 | 12/2005 | Wishart | |
| 7,128,221 | B2 | 10/2006 | Metcalf | |
| 7,175,034 | B2 | 2/2007 | Nook | |
| 7,178,890 | B2 | 2/2007 | Park | |
| 7,198,160 | B2 | 4/2007 | Ernst | |
| 7,246,711 | B1 | 7/2007 | Metcalf | |
| 7,260,438 | B2 | 8/2007 | Caldwell | |
| 7,306,303 | B2 | 12/2007 | Ritchie | |
| 7,311,211 | B2 | 12/2007 | Chung | |
| 7,337,730 | B2 | 3/2008 | Bienick | |
| 7,533,948 | B2 | 5/2009 | Smith | |
| 7,611,111 | B2 | 11/2009 | Costa | |
| 8,020,714 | B2 * | 9/2011 | Miller et al. | 211/134 |
| 8,127,948 | B2 | 3/2012 | Davis | |
| 8,556,093 | B2 * | 10/2013 | Davis et al. | 211/187 |
| 8,672,577 | B2 * | 3/2014 | Wojtowicz et al. | 403/286 |
| 9,004,300 | B1 * | 4/2015 | Morrell | 211/187 |
| 2003/0173320 | A1 | 9/2003 | Linney | |
| 2004/0245199 | A1 | 12/2004 | Chen | |
| 2005/0000924 | A1 | 1/2005 | Webb | |
| 2005/0092701 | A1 | 5/2005 | Metcalf | |
| 2005/0127017 | A1 | 6/2005 | Kessel | |
| 2006/0076303 | A1 | 4/2006 | Scholen | |
| 2006/0076304 | A1 * | 4/2006 | Kainuma | A47F 3/00 |
| | | | | 211/90.01 |
| 2007/0012640 | A1 | 1/2007 | Scholen | |
| 2007/0068885 | A1 | 3/2007 | Busto | |
| 2007/0080123 | A1 | 4/2007 | Mason | |
| 2007/0125727 | A1 | 6/2007 | Winkler | |
| 2007/0193971 | A1 | 8/2007 | Hardy | |
| 2007/0295681 | A1 | 12/2007 | Colin | |
| 2008/0048081 | A1 | 2/2008 | Costa | |
| 2008/0061015 | A1 | 3/2008 | Hardy | |
| 2008/0116156 | A1 | 5/2008 | Park | |
| 2011/0056899 | A1 * | 3/2011 | Shinozaki | 211/153 |
| 2012/0298601 | A1 * | 11/2012 | Biglow | A47F 5/101 |
| | | | | 211/59.2 |
| 2014/0034594 | A1 | 2/2014 | Davis | |
| 2014/0110366 | A1 * | 4/2014 | Wu | 211/135 |

FOREIGN PATENT DOCUMENTS

| | | |
|---|---|---|
| EP | 919165 A1 | 6/1999 |
| JP | 6034265 B2 | 5/1994 |
| WO | WO2006096353 A2 | 9/2006 |

OTHER PUBLICATIONS

ADCO Industries, "Storage Shelving—For Coolers, Backroom Dry Storage and Off-the-Floor Shelving," [online], <http://www.adcoindustries.com/shelving.htm>, retrieved Feb. 8, 2008, 1 page.

ADCO Industries, "Beverage Cooler Management Products," [online], <http://www.adcoindustries.com/cooler.htm>, retrieved Feb. 8, 2008, 1 page.

The Guide to Successful Beverage Cooler Management, "A Comprehensive Management Program for Beverage Coolers Using the Mini Mule Dolly System," [online], <http://www.adcoindustries.com/MULEBROC.pdf>, (link from AP reference above), retrieved Feb. 8, 2008, 15 pages.

Welcome to Display Technologies, "Partners in Innovation—Optimizers," [online], <http://www.display-technologies.com/products/techstoc_flooroptim.html>, retrieved Feb. 8, 2008, 2 pages.

(56) References Cited

OTHER PUBLICATIONS

Welcome to Display Technologies, "Partners in Innovation—Home—Custom Products—Keebler Company," [online], <http://www.display-technologies.com/products/custom/prod_keebler.html>, retrieved Feb. 13, 2008, 3 pages.

Search Report issued in corresponding European Patent Application No. 08153842.3 dated Aug. 6, 2008; 6 pages.

Search Report issued in related European Patent Application No. 08153836.5 dated Aug. 12, 2008; 7 pages.

Office Action dated Dec. 8, 2010 for U.S. Appl. No. 12/031,482 "Supporting Consumer Products" by Raymond E. Davis et al., 13 pages.

USPTO Office Action for U.S. Appl. No. 12/031,482 dated Apr. 25, 2011, 7 pages.

EP Office Action for Application No. 08153842.3 dated Jul. 18, 2012, 4 pages.

EP Office Action for Application No. 08153842.3 dated Jan. 3, 2013, 4 pages.

EP Office Action for Application No. 08153842.3 dated Apr. 29, 2013, 3 pages.

* cited by examiner

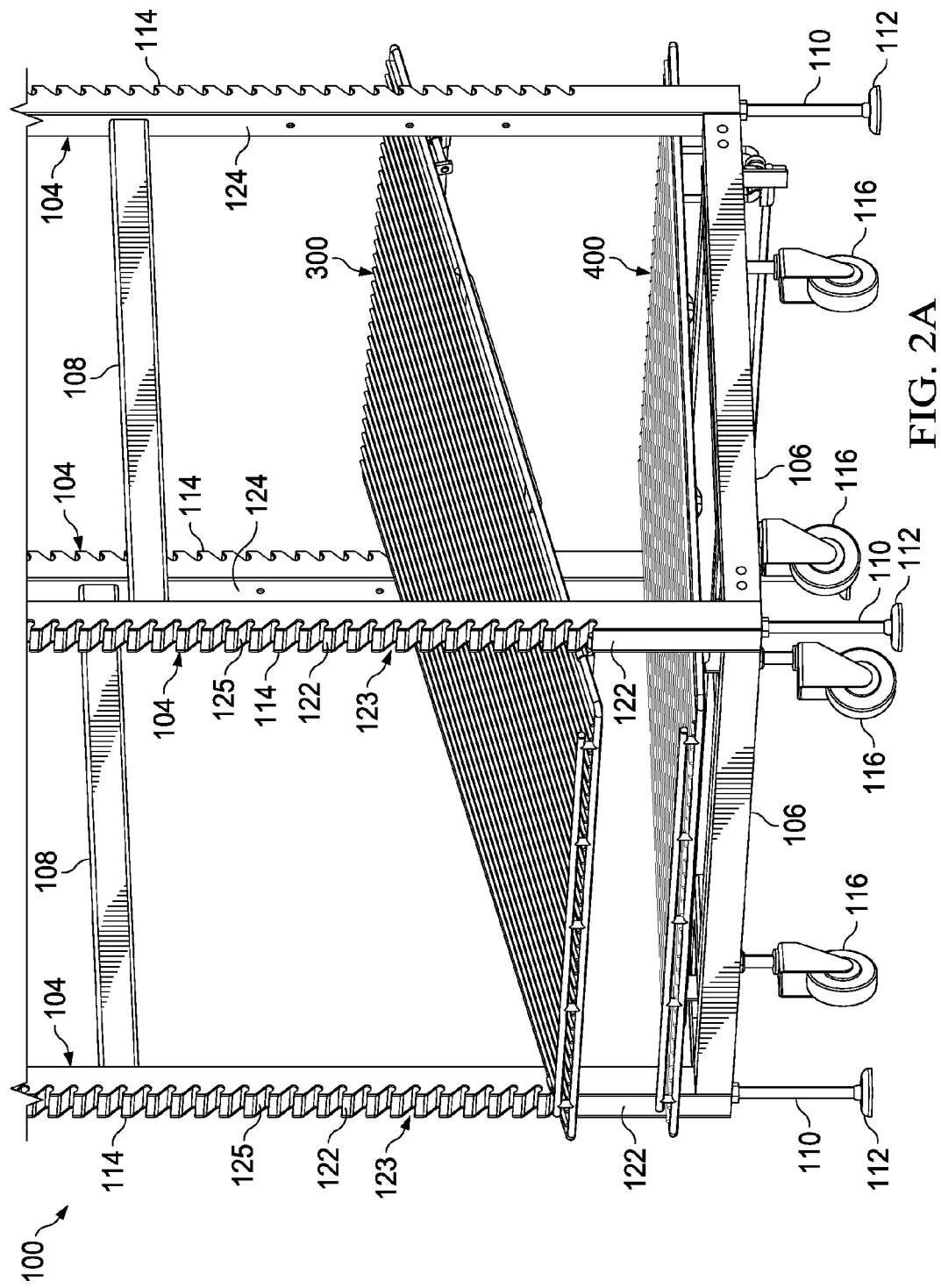

SUPPORTING CONSUMER PRODUCTS

TECHNICAL BACKGROUND

This disclosure relates to supporting consumer products for display and storage, and more particularly, to supporting consumer products on adjustable and/or mobile shelves within a self-supporting frame system.

BACKGROUND

Storage and display of consumer products may be accomplished by a variety of different devices, structures, and methods. In particular, the storage and display of food products and beverages may typically utilize a shelving apparatus consisting of a frame and one or more shelves connected to the frame. The frame, generally, may include four vertical legs, which allow each shelf to be attached to the legs at each corner of the shelf. In such a fashion, many product shelving apparatus may rely almost exclusively on the connection of the shelves to the vertical legs to allow the entire structure to stand upright and support the product.

Consumer products, such as food and beverage containers, also come in many different sizes and configurations. For example, although particular beverage containers, such as, for example, aluminum cans, are substantially similar in certain dimensions (e.g., diameter), different brands or drink-types may come in containers of varying height. Often, a shelving apparatus designed to support various types of containers may be able to change a distance between shelves to account for the height difference in the containers. In order to change this distance, however, product may need to be removed from the particular shelf or shelves before such a change may take place. Moreover, depending on the number of shelves to be changed and the degree to which such shelves support the shelving apparatus frame, an amount of time and labor required to effect such a change may be great.

In the case of food and beverage containers, such containers often break or leak the food substance onto the shelving apparatus on which they are supported. Because cleanliness in the storage and display of food and beverages may be of particular concern for certain businesses, such as grocery stores and convenience stores, broken or leaking food and beverage containers may cause problems for a particular shelving apparatus. For instance, various shelving apparatus may be particularly immobile when supporting a capacity of food and beverage product. Thus, food and beverage substances that leak onto a floor below the shelving apparatus may be particularly difficult to remove. In such cases, removal of the entire capacity of food product or even disassembly of the shelving apparatus may be required in order to sanitize the floor.

SUMMARY

This disclosure relates to supporting consumer products for display and storage, and more particularly, to supporting consumer products on adjustable and mobile shelves within a self-supporting frame system for use in, for example, a walk-in cooler or other display area.

In an example implementation, a shelving apparatus includes a frame structure formed with a plurality of vertical members and a plurality of horizontal members and a shelf adjustable between a plurality of positions within the volume and supported, at each position, by the plurality of vertical members. The plurality of vertical members and plurality of horizontal members define a volume therebetween, and each of the vertical members include a plurality of notches formed on a vertical surface of the each vertical member. The shelf includes a frame; a product surface coupled with the frame; a first rod coupled to the frame and insertable into at least a portion of a respective notch of the plurality of notches of one of the vertical members; and a second rod coupled to the frame and insertable into at least a portion of a respective notch of the plurality of notches of another of the vertical members. The second rod is forcibly biased, by a biasing member coupled with the frame, against at least one of the vertical members.

In a first aspect combinable with the general implementation, the frame structure further includes at least one fill member insertable into a particular vertical member of the plurality of vertical members.

In a second aspect combinable with any of the previous aspects, the fill member includes a plurality of recesses that align, when the fill member is inserted into the particular vertical member, with the plurality of notches of the particular vertical member.

In a third aspect combinable with any of the previous aspects, the at least one fill member includes a plurality of fill members.

In a fourth aspect combinable with any of the previous aspects, each of the plurality of fill members is insertable into one of the vertical members.

In a fifth aspect combinable with any of the previous aspects, each fill member includes a plurality of recesses that align, when the each fill member is inserted into the one of the vertical members, with the plurality of notches of the one of the vertical members.

In a sixth aspect combinable with any of the previous aspects, the first rod is insertable into at least a portion of a particular recess of the plurality of recesses of the fill member.

In a seventh aspect combinable with any of the previous aspects, the portion of the particular recess includes about half of a width of the recess.

In an eighth aspect combinable with any of the previous aspects, at least one of the vertical members includes a plurality of vertical member segments that are coupled together to form the at least one vertical member.

In a ninth aspect combinable with any of the previous aspects, the at least one fill member includes a plurality of fill member segments.

In a tenth aspect combinable with any of the previous aspects, each of the fill member segments is coupled to at least one of the plurality of vertical member segments.

An eleventh aspect combinable with any of the previous aspects further includes a plurality of adjustable leg members coupled to the frame; and a plurality of feet, each foot coupled to a particular adjustable leg member.

In a twelfth aspect combinable with any of the previous aspects, each position of the plurality of positions includes a distinct height of the shelf within the volume, and a distinct angle of the shelf relative to the plurality of vertical members.

A thirteenth aspect combinable with any of the previous aspects further includes a mobile shelf that includes a mobile shelf frame, a mobile shelf product surface coupled to the mobile shelf frame, and a plurality of casters coupled to the mobile shelf frame, the mobile shelf positionable within the volume.

In a fourteenth aspect combinable with any of the previous aspects, the product surface is integrally formed with the frame.

In another general implementation, a shelving system includes a first frame, a second frame, a first shelf, and a second shelf. The first frame is formed with a plurality of first vertical members and a plurality of first horizontal members, with the plurality of first vertical members and plurality of first horizontal members defining a first volume therebetween, and each of the first vertical members including a plurality of notches formed on a vertical surface of the each first vertical member. The second frame is formed with a plurality of second vertical members and a plurality of second horizontal members, with the plurality of second vertical members and plurality of second horizontal members defining a second volume therebetween, and each of the second vertical members including a plurality of notches formed on a vertical surface of the each second vertical member. One of the second vertical members and one of the first vertical members include a first common vertical member of the first and second frames, and another of the second vertical members and another of the first vertical members include a second common vertical member of the first and second frames. The first shelf is adjustable between a plurality of positions within the first volume and supported, at each position, by the plurality of first vertical members, and includes a first frame; a first product surface coupled with the first frame; a first front rod coupled to the first frame and including end portions, each end portion of the first front rod insertable into a portion of a respective notch of the first common vertical member; and a first rear rod coupled to the first frame and including end portions, each end portion of the first rear rod insertable into a portion of a respective notch of the second common vertical member, the first rear rod forcibly biased, by a first biasing member coupled with the first frame, against the second common vertical member. The second shelf is adjustable between a plurality of positions within the second volume and supported, at each position, by the plurality of second vertical members, and includes a second frame; a second product surface coupled with the second frame; a second front rod coupled to the second frame and including end portions, each end portion of the second front rod insertable into another portion of the respective notch of the first common vertical member; and a second rear rod coupled to the second frame and including end portions, each end portion of the second rear rod insertable into another portion of the respective notch of the second common vertical member, the second rear rod forcibly biased, by a second biasing member coupled with the second frame, against the second common vertical member.

A first aspect combinable with the general implementation further includes a fill member insertable into the first common vertical member, the fill member including a plurality of recesses that align, when the fill member is inserted into the first common vertical member, with a plurality of notches of the first common vertical member.

In a second aspect combinable with any of the previous aspects, one of the end portions of the first front rod and one of the end portions of the second front rod are insertable into a particular recess of the plurality of recesses of the fill member.

In a third aspect combinable with any of the previous aspects, each position of the plurality of positions of the first shelf includes a distinct height of the first shelf within the first volume, and a distinct angle of the first shelf relative to the plurality of first vertical members.

In a fourth aspect combinable with any of the previous aspects, each position of the plurality of positions of the second shelf includes a distinct height of the second shelf within the second volume, and a distinct angle of the second shelf relative to the plurality of second vertical members.

In another general implementation, a method for supporting consumer products with a shelving apparatus that includes a frame structure formed with a plurality of vertical members and a plurality of horizontal members that define a volume therebetween; and a shelf that includes a frame, a product surface coupled with the frame, a first rod coupled to the frame, and a second rod coupled to the frame, includes adjusting the shelf within the volume to insert the first rod into at least a portion of a first notch of a plurality of notches of a first vertical member of the plurality of vertical members; adjusting the shelf within the volume to insert the second rod into at least a portion of a first notch of a plurality of notches of a second vertical member such that the second rod is forcibly biased against the second vertical member by a biasing member; and applying a force opposed to the biasing force of the biasing member to remove the second rod from the portion of the second notch.

A first aspect combinable with the general implementation further includes adjusting, while the first rod is supported in the first notch of the first vertical member, the shelf to align the second rod with a second notch of the plurality of notches of the second vertical member that is different than the first notch of the plurality of notches of the second vertical member.

A second aspect combinable with any of the previous aspects further includes inserting the second rod into at least a portion of the second notch of the plurality of notches of the second vertical member such that the second rod is forcibly biased against the second vertical member by the biasing member.

In a third aspect combinable with any of the previous aspects, an angle of the shelf relative to the plurality of vertical members when the second rod is supported by the first notch of the second vertical member is different than an angle of the shelf relative to the plurality of vertical members when the second rod is supported by the second notch of the second vertical member.

A fourth aspect combinable with any of the previous aspects further includes removing the first rod from the portion of the first notch of the plurality of notches of the first vertical member; subsequent to applying the force, removing the second rod from the portion of the first notch of the plurality of notches of the second vertical member; and adjusting the shelf from a first position in the volume to a second position in the volume that is different than the first position.

A fifth aspect combinable with any of the previous aspects further includes inserting the first rod into at least a portion of a second notch of the plurality of notches of the first vertical member; and inserting the second rod into at least a portion of a second notch of the plurality of notches of the second vertical member such that the second rod is forcibly biased against the second vertical member by the biasing member.

A sixth aspect combinable with any of the previous aspects further includes adjusting, while the second rod is supported in the first notch of the second vertical member, the shelf to align the first rod with a second notch of the plurality of notches of the first vertical member that is different than the first notch of the plurality of notches of the first vertical member.

A seventh aspect combinable with any of the previous aspects further includes inserting the first rod into at least a portion of the second notch of the plurality of notches of the first vertical member.

In an eighth aspect combinable with any of the previous aspects, an angle of the shelf relative to the plurality of vertical members when the first rod is supported by the first notch of the first vertical member is different than an angle of the shelf relative to the plurality of vertical members when the first rod is supported by the second notch of the first vertical member.

Various implementations of a system for supporting consumer products according to the present disclosure may include one or more of the following features. For example, the system may include a frame structure that is self-supporting and may remain upright during product loading and removal. As another example, the system may include a substructure that minimizes product handling during product exchange and increases safety during a product loading process of the system. Also, the system may include a frame structure that allows a particular adjustable shelf to be installed or removed independently of other adjustable shelves within the system. As another example, the system may include a frame structure that remains decoupled from a walk-in cooler structure without loss of structural integrity. The system may also allow for a frame structure that may be adjustable for plumb at multiple points of the frame structure without removal of product. As another example, the system may include a frame structure that may provide a more sanitary food and beverage support system by allowing less food and beverage substance to become entrained in the frame structure. As an even further example, the system may include a frame structure and moveable product support shelf that allows access to a floor beneath the frame structure to achieve a higher degree of sanitation. The system may also allow consumer product to be supported and displayed at various gravity feed angles on a moveable support shelf. As another example, the system may allow for a moveable support shelf to lockably engage with a frame structure to allow for easier product removal and exchange independent of movement of the frame structure. As another example, the device or system may allow for multiple frame structures to share one or more vertical supports to more efficiently utilize floor space.

Various implementations of a device or a system for supporting consumer products according to the present disclosure may also include one or more of the following additional features. For example, the device or system may include an adjustable shelf independently moveable and removable of other adjustable shelves, and to incremental positions within the frame structure. Also, the device or system may allow for an adjustable shelf to be vertically adjusted under load from a single side of the adjustable shelf. As an additional example, the device or system may allow for varying gravity feed angles of an adjustable shelf. As yet an additional example, the device or system may allow for a mobile, cantilevered shelf through a rack and pinion gear system. In addition, the device or system may allow an adjustable shelf to receive high loads by utilizing a hook and bar system on a front and back of the shelf.

These general and specific aspects may be implemented using a device, system or method, or any combinations of devices, systems, or methods. The details of one or more implementations are set forth in the accompanying drawings and the description below. Other features, objects, and advantages will be apparent from the description and drawings, and from the claims.

DESCRIPTION OF DRAWINGS

FIGS. 2A-2B illustrate closer views of an example implementation of a portion of a shelving apparatus for supporting and displaying consumer products;

DETAILED DESCRIPTION

Figure 1A:
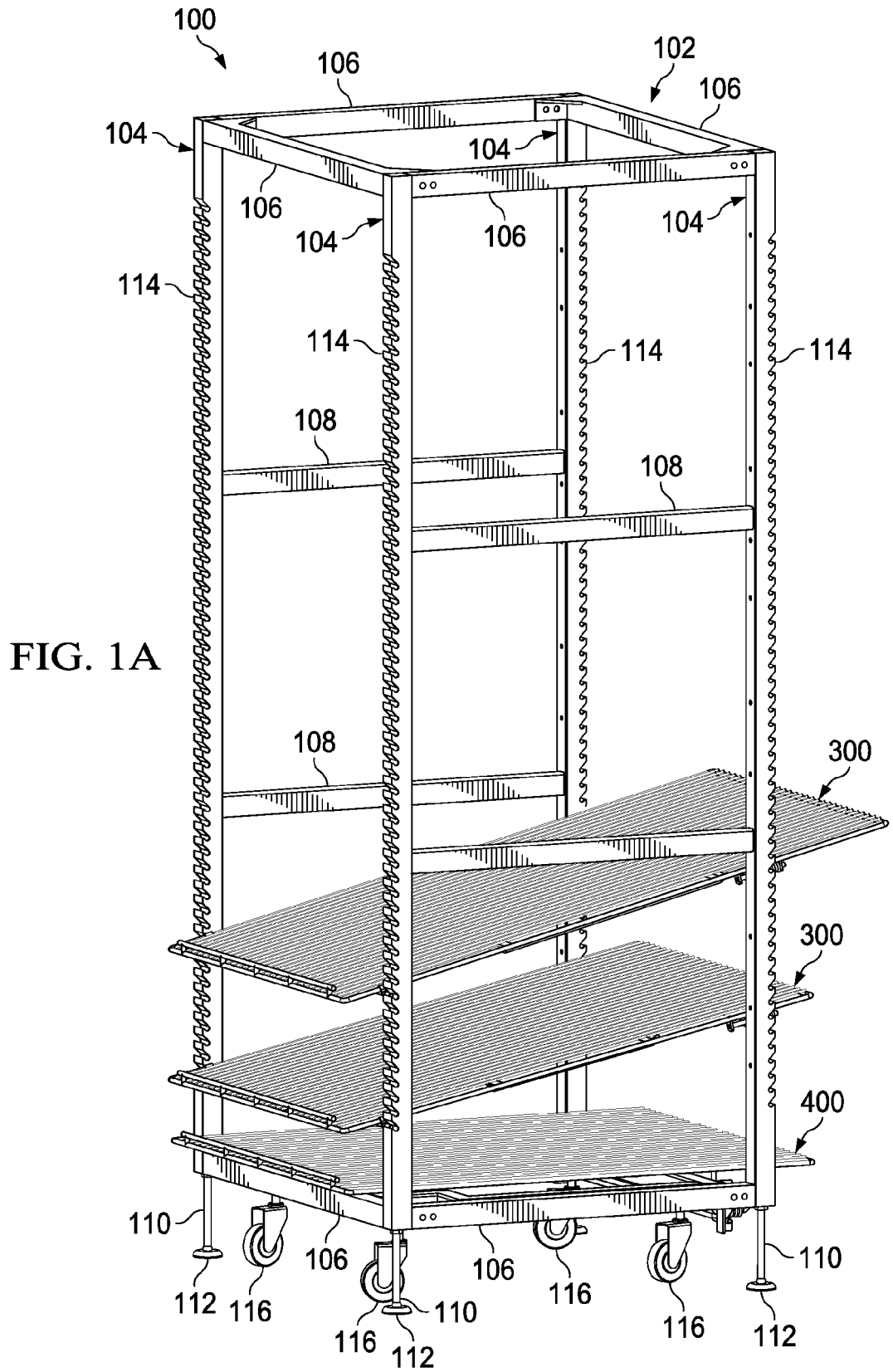
FIGS. 1A-1C illustrate an example implementation of a shelving apparatus for supporting and displaying consumer products, including one or more adjustable shelves and a mobile support shelf.
Figure 1B:
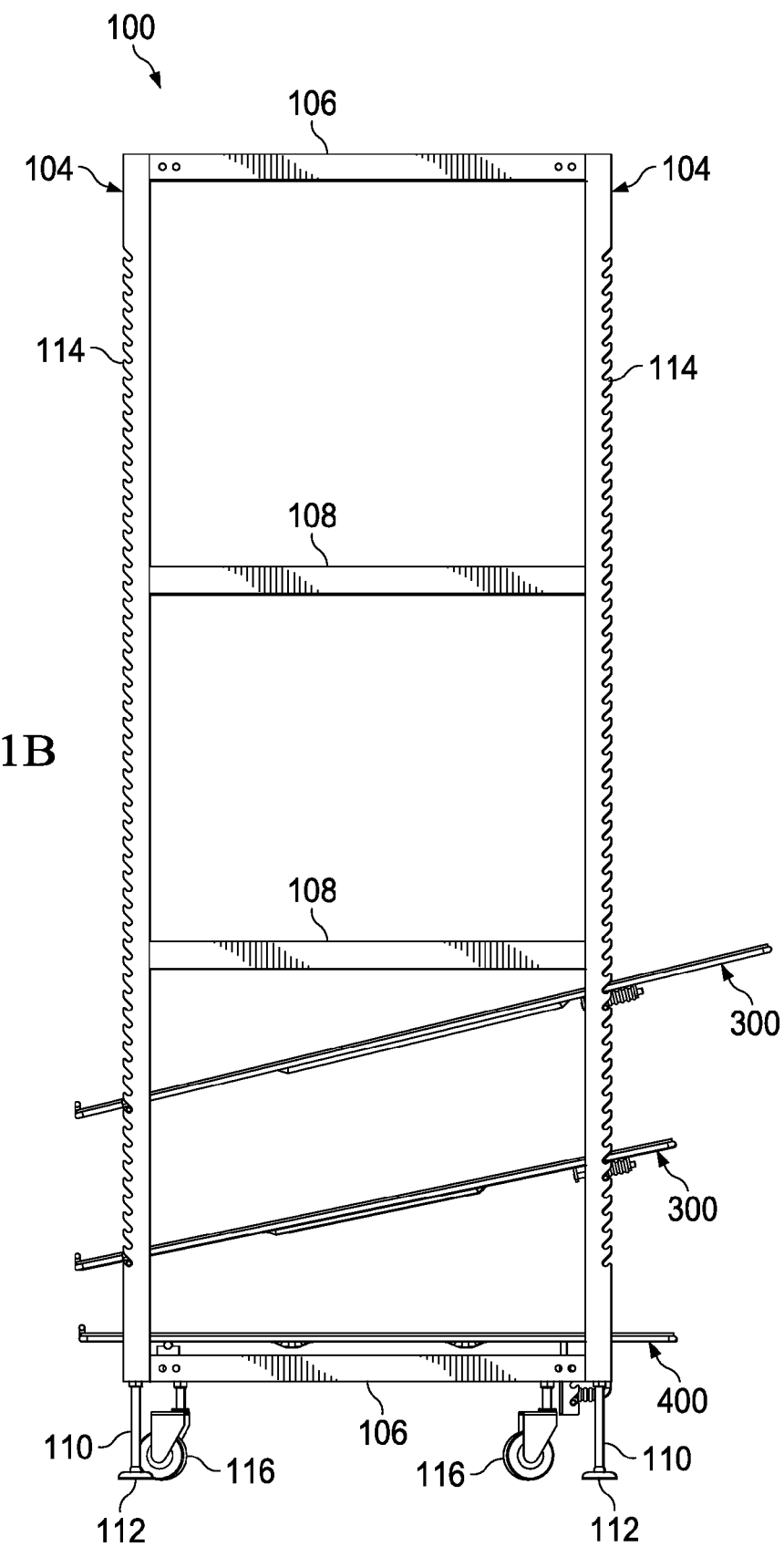
Figure 1C:
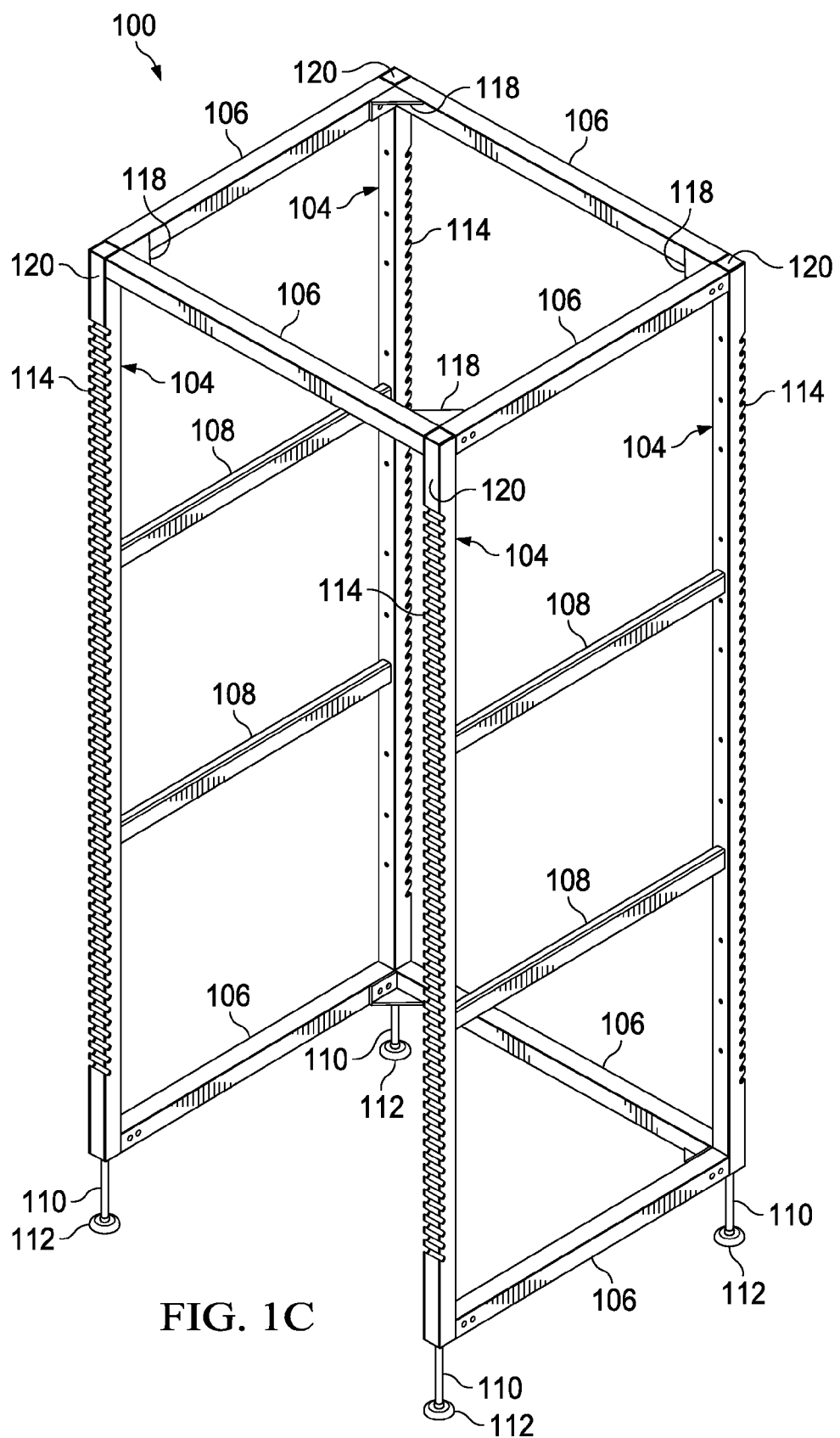

FIGS. 1A-1C illustrate an example implementation of a shelving apparatus 100 for supporting and displaying consumer products, including one or more adjustable shelves 300 and a mobile support shelf 400. The shelving apparatus 100 includes a frame 102 formed by vertical members 104 and horizontal members 106. In this example implementation, the apparatus 100 includes four vertical members 104 that define a square or rectangular cross section of a volume defined by the frame 102 (e.g., defined by the vertical members 104 and horizontal members 106). As illustrated, the horizontal members 106 are coupled to the vertical members 104 (e.g., mechanically or otherwise) at top ends and at bottom ends of the vertical members 104. In the example implementation, cross members 108 are coupled between adjacent vertical members 104 between the top and bottom ends of the member 104. Although two cross members 108 per side are shown, there may be more or fewer cross members 108, as well as, in some examples, cross members 108 may be coupled between other adjacent vertical members 104.

As shown, apparatus 100 includes legs 110 coupled to the frame 102. In this example implementation, the legs 110 are coupled to bottom ends of the vertical members 104. Feet 112, in this implementation, are coupled to the legs 110 to provide support for the apparatus 100 on a floor or other planar surface. In some aspects, the legs 110 may be threadingly coupled (or otherwise) to the frame 102 (e.g., vertical members 104 or horizontal members 106) to provide for height adjustment of the frame 102. In some aspects, the feet 112 may also provide for incremental height adjustment of the frame 102.

Figure 4A:
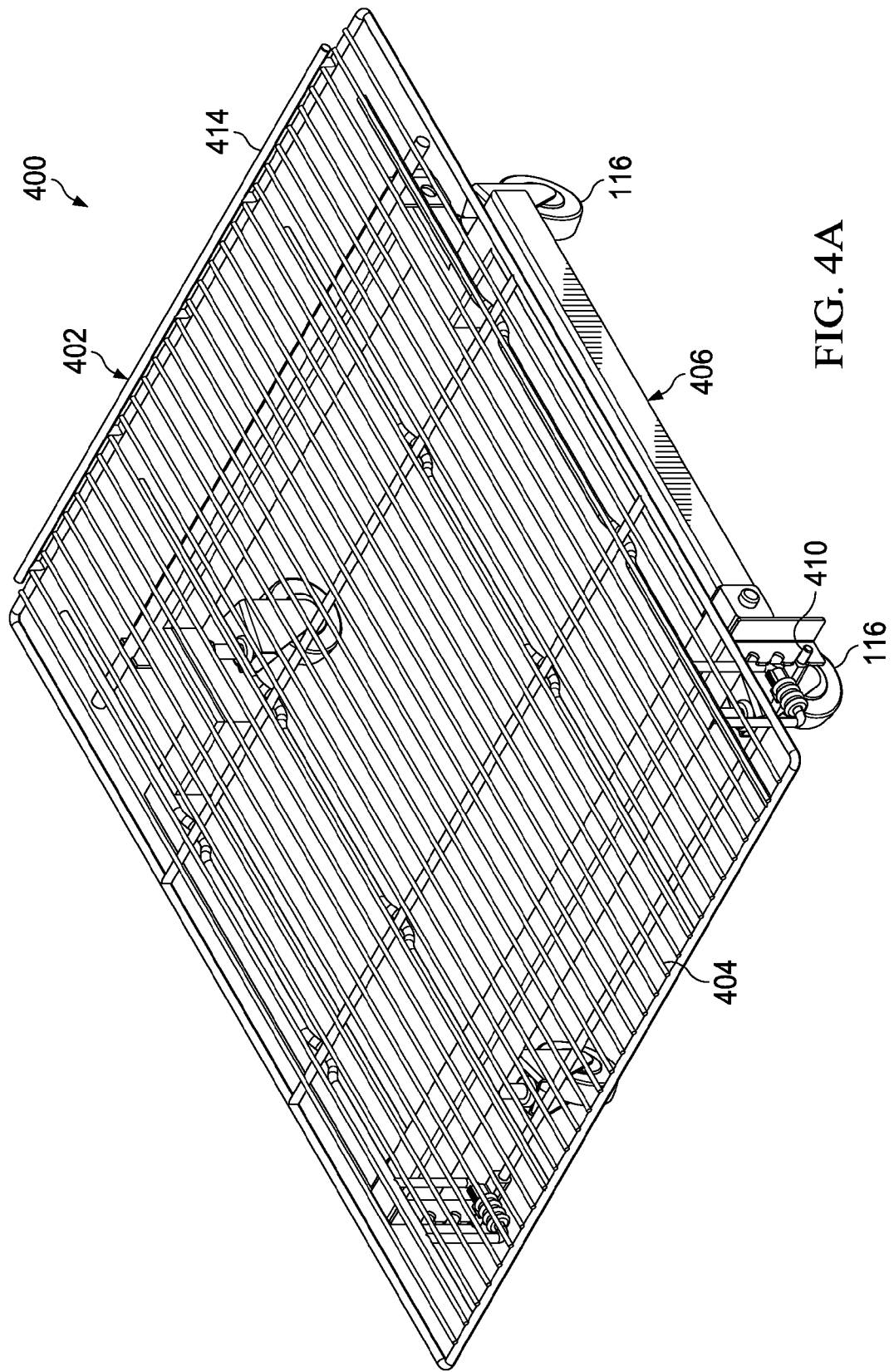
FIGS. 4A-4C illustrate an example implementation of a mobile shelf for a shelving apparatus.

In the illustrated apparatus 100, one or more casters 116 may be coupled to the frame 102 and/or the mobile shelf 400. The casters 116 may be height adjustable such that, in situations where the shelving apparatus 100 is set in a desired location, the casters 116 may be raised above the floor or surface, and then lowered to contact the floor or surface once movement of the apparatus 100 is desired. In some implementations, such as is shown in FIG. 4A, the casters 116 are coupled to the mobile shelf 400 and additional caster or rollers (or wheels) may be coupled to the frame 102.

In the illustrated implementations, each vertical member 104 include notches 114 formed on a particular side of the vertical member 104. As shown, the notches 114 are formed on (or attached to, as in hooks) a vertical surface that faces away from the volume defined by the frame 102. As shown, the notches 114 are formed substantially the whole height of each vertical member 104, and may be formed every ½", 1 inch, 2 inches, or other spacing as appropriate.

As shown in FIG. 1C, a particular side of the frame 102 may be substantially open (e.g., without any horizontal members 106 and/or cross members 108 extending across the side between vertical members 104). In some aspects, the open side may be positioned on a back side of the frame 102, and may provide an opening through which the adjustable shelves 300 and/or mobile shelf 400 may be positioned within the volume.

As further shown in FIG. 1C, caps 120 may be used to couple or help couple the vertical members 104 and the horizontal members 106 together (e.g., at the top and bottom ends of the vertical members). The caps 120, in some aspects may provide further structural strength to the frame 102 and, in combination with the vertical members 104, horizontal members 106 and cross members 108, provide for a standalone, self-supporting frame 102. Further providing structural stability in the illustrated implementation are corner pieces 118, which may also help couple the vertical members 104 and the horizontal members 106. The caps 120 and corner pieces 118 may be positioned both at the top ends and bottom ends of the vertical members 104, as appropriate for structural stability.

Figure 2B:
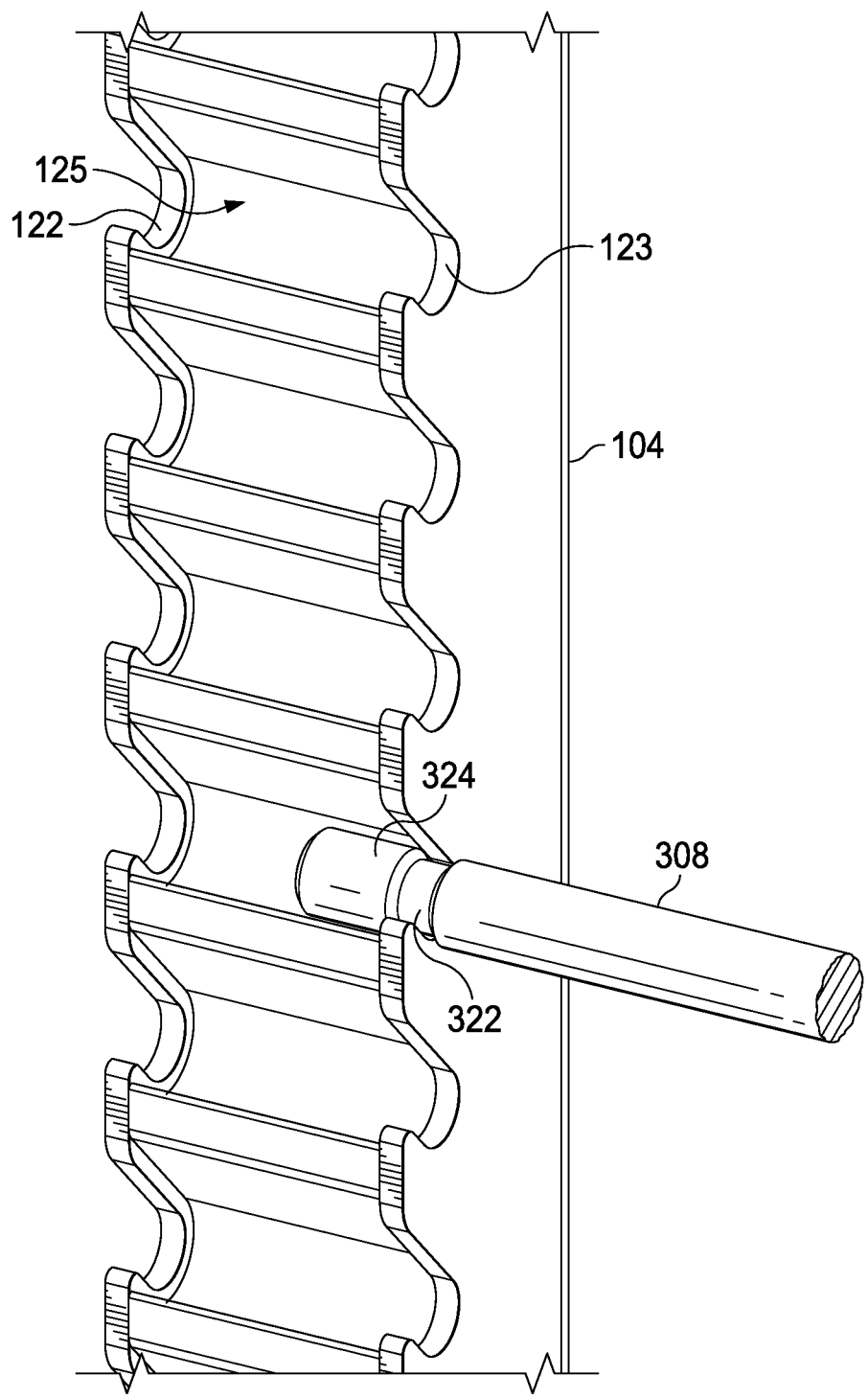

FIGS. 2A-2B illustrate closer views of an example implementation of a portion of the shelving apparatus 100 for supporting and displaying consumer products. As shown in FIG. 2A, a leg filler 122 may be inserted into each vertical member 104. For example, the vertical members 104 may be u-shaped structural members with one side open to receive the leg fillers 122. The open side of each vertical member 104 may receive the leg filler 122, which includes recesses 125 that, when the leg filler 122 is inserted into the vertical member 104, align with notches 114 of the vertical member 104.

In some aspects, the leg filler 122 may be a molded plastic filler that, for example, may prevent or help prevent contamination from entering the vertical member 104. The leg filler 122 may also be removable from the cavity of the vertical member 104 and sterilized for added health security. In some aspects, the leg filler 122 may blocks extend over a side wall of the vertical member 104 to prevent injury during adjustment of the shelf 300, and also to protect a customer or user of the shelving apparatus 100 during normal use.

Upon alignment of a recess 125 of the leg filler 122 and two notches of the vertical member 104 (e.g., one on either side of the recess 125), a support surface 123 is formed which extends across a width of the vertical member 104. Thus, when a complete (or substantially complete) height of the vertical member 104 is filled with the leg filler 122, multiple support surfaces 123 are formed as the recesses 125 align with the notches 114. As explained in more detail with reference to FIGS. 3A-3C, the support surfaces 123 may receive and support the adjustable shelves 300 within the frame 102.

In some aspects, each vertical member 104 may be a single piece that extends an entire height of the frame 102. In alternative aspects, one or more of the vertical members 104 may comprise multiple segments that are coupled (e.g., mechanically or otherwise) together to form the vertical member 104. Likewise, in some aspects, each leg filler 122 may be a single piece that extends the entire length of a single vertical member 104. In alternative aspects, multiple leg fillers 122 may be inserted into a single vertical member 104. In even other aspects, there may be multiple leg fillers 122 and multiple segments of the vertical member 104 (e.g., in a 1:1 ratio or otherwise). Each leg filler 122 may be coupled to the vertical member 104 (or segment of the vertical member 104) with a back cover 124 as shown in FIG. 2A.

As illustrated in FIG. 2B, in some implementations, a front rod 308 of the adjustable shelf 300 (described more fully below) may include a recess 322 and a head 324 that secure or help secure the front rod 308 (and thus the shelf 300) into the vertical member 104. As shown, the head 324 of the rod 308 may fit within the recess 125 (e.g., within about half of the recess 125), and in contact with the support surface 123. The recess 322 may be supported on the leg filler 122 such that the head 324 is prevented (all or partially) from moving laterally within the recess 125. Such a configuration may also be implemented in a back rod 410 of the shelf 300.

Figure 3A:
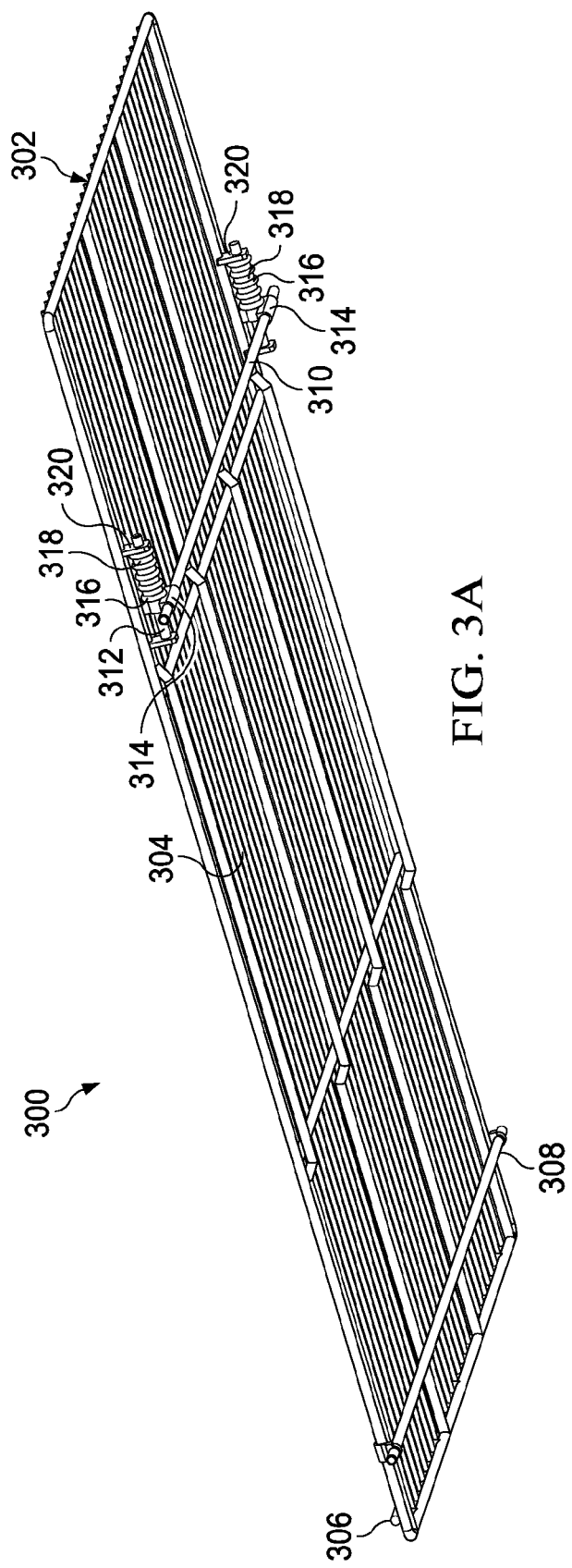
FIGS. 3A-3C illustrate an example implementation of an adjustable shelf for a shelving apparatus.
Figure 3B:
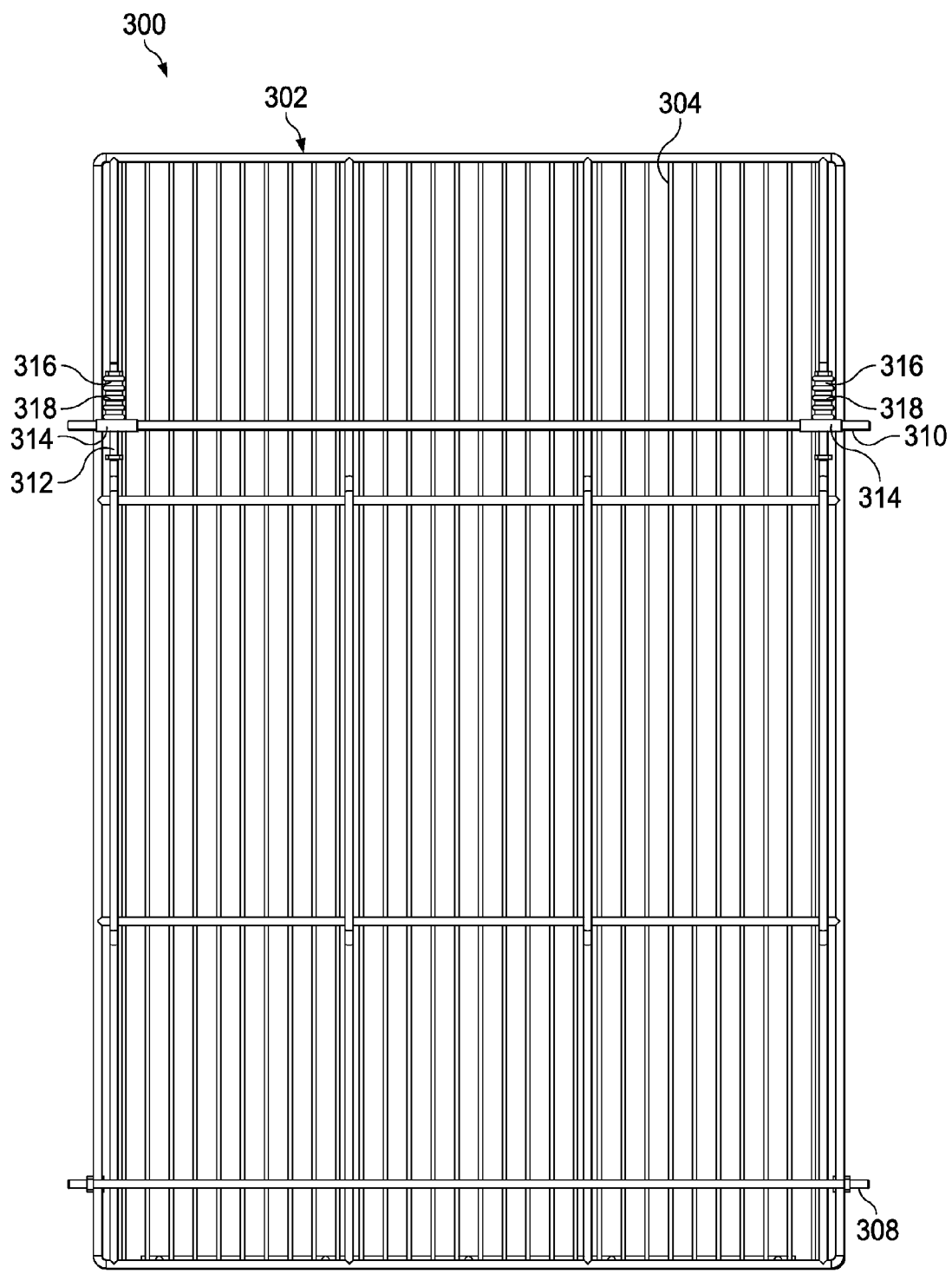
Figure 3C:
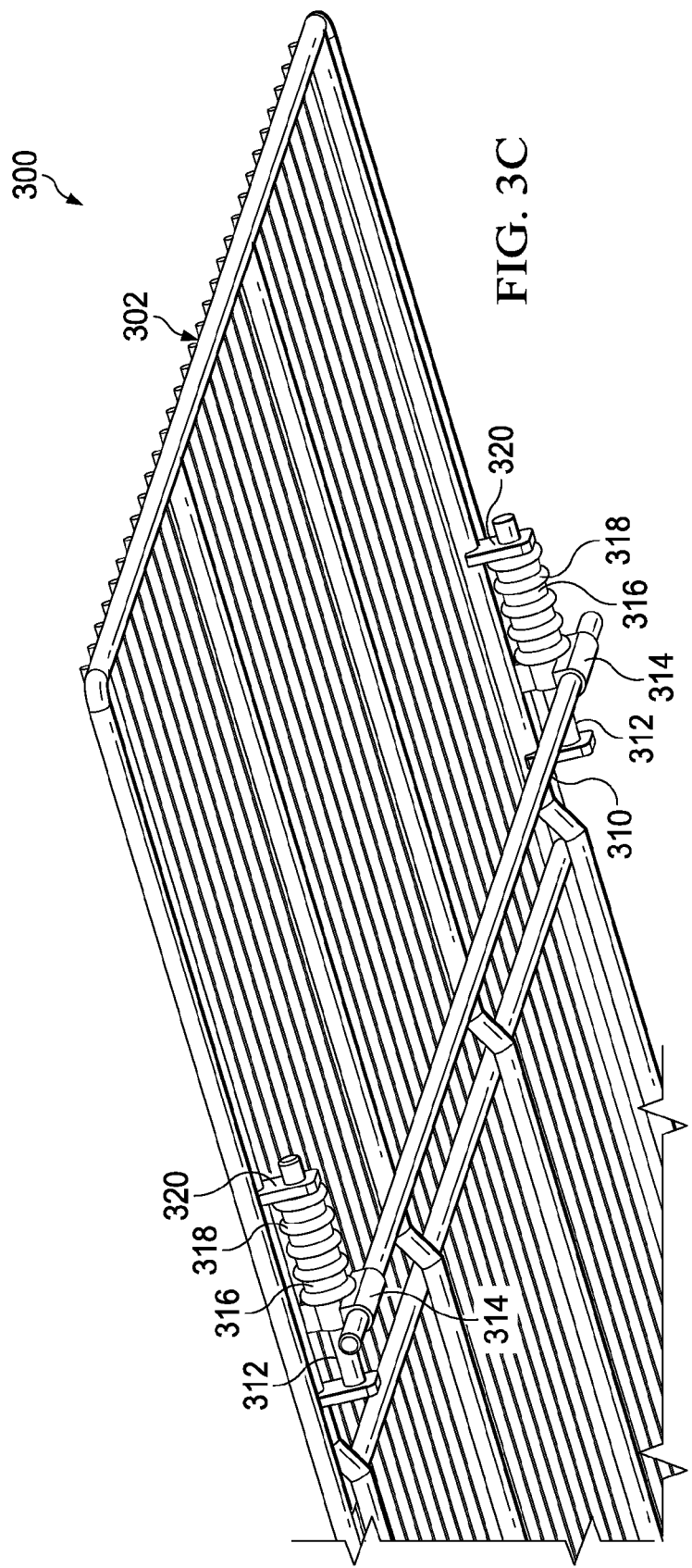

FIGS. 3A-3C illustrate an example implementation of the adjustable shelf 300 for the shelving apparatus 100. For example, as shown in FIGS. 1A-1C, one or more adjustable shelves 300 may be positioned in the volume of the frame 102 and supported by the frame 102 in the apparatus 100. Each adjustable shelf 300 may be moved to multiple positions (e.g., heights) within the frame 102, for instance, supported on the support surfaces 123 formed by the notches 114 and the recesses 125 of the leg fillers 122.

In the illustrated implementation, a particular shelf 300, when loaded with product, can be moved within the volume, or angle adjusted, without removing other shelves 300 above or below the particular shelf 300. Further, each of multiple shelves 300 within the frame 102 may be added or removed without disturbing other shelves 300 above or below. Additionally, spacing or angle of shelving 300 can be repositioned without unloading any shelves 300. In some aspects, a single user or operation, moving from front to back, can change a shelf location or angle of a shelf 300. In some aspects, two operators, front and back, can change a shelf location or angle of a shelf 300.

The illustrated example of the adjustable shelf 300 includes a frame 302 and a product surface 304 coupled to the frame to support one or more consumer or other products. Although shown as a wire mesh surface, the product surface 304 may be solid, semi-solid, or otherwise to support the product. Also, in some implementations, the frame 302 and surface 304 may be integrated into a single structure.

A stop bar 306 is shown coupled to the frame 302 (but also may be coupled to the surface 304). In some examples, the stop bar 306 is positioned at a front of the shelf 300 and may provide for a handle or other structure to allow repositioning of the shelf 300 within the frame 102. Also, the stop bar 306 may stop or arrest movement of product so that the product does not fall off the shelf 300 (e.g., when the shelf 300 is tiled or angled with respect to horizontal).

A front bar 308 is illustrated as coupled to the frame 302 near a front of the shelf 300 and positioned on an underside of the shelf 300. As illustrated, the front bar 308 includes ends that extend beyond the frame 302. As explained more fully below, the ends of the front bar 308 may be positioned in all or a portion of the support surfaces 123 formed by the notches 114 and recesses 125 (or, in some instances, just the notches 114). The front bar 308 may thus support or help support the shelf 300 within the frame when engaged in the support surfaces 123.

In the illustrated example, a connector 320 is coupled to the frame 302 (or the product surface 304) at or near a back end of the shelf 300. The connector 320, as shown, includes two connections to the frame 302 with a rod 312 coupled therebetween. A release rod 310 is coupled to the rod 312 with a coupling 314. As illustrated, the aforementioned structures are positioned on both sides of the shelf 300.

As illustrated, positioned between the coupling 314 and one end of the connector 320 is a biasing member 318 (e.g., a spring or other potential energy member) that rides on the rod 312 and is bounded by the coupling 314 on one side and the end of the connector 320 on another side. In some aspects, the biasing member 318 exerts a constant or substantially constant force on the coupling 314 to drive the coupling 318 (and release rod 310) toward a front of the shelf 300 as the coupling 318 rides on the rod 312. A force applied toward a back of the shelf 300, such as through the release rod 310, may compress the biasing member 318 as the coupling 314 slides on the rod 312. As further illustrated in this example implementation, a cover 316 is mounted over the biasing member 318, for example, to help prevent or prevent debris ingress into the biasing member 318.

Figure 4B:
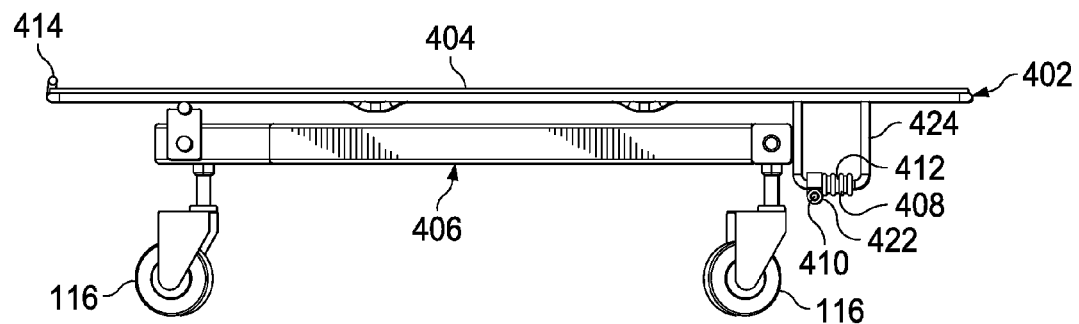
Figure 4C:
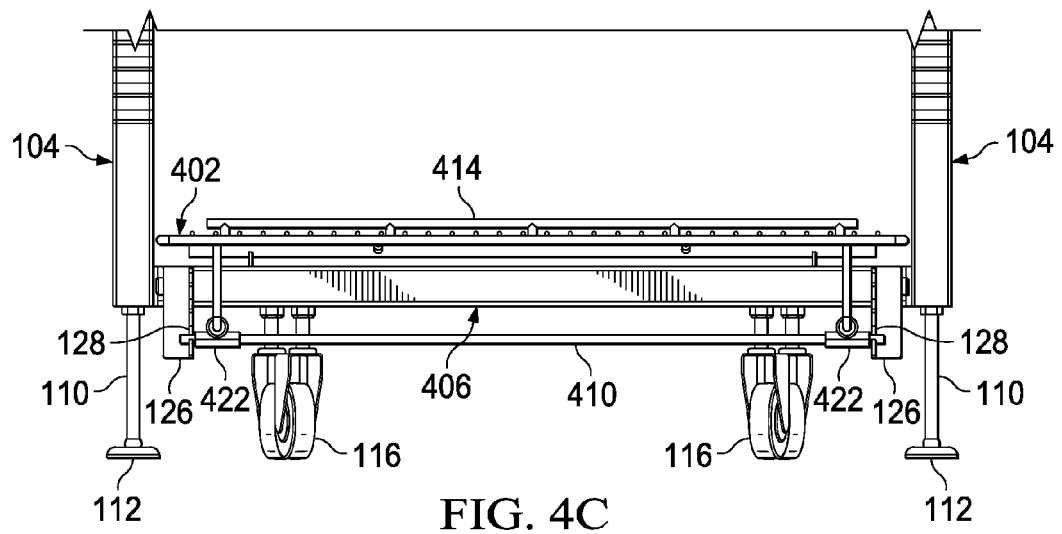

FIGS. 4A-4C illustrate an example implementation of a mobile shelf 400 for the shelving apparatus 100. As shown in FIG. 1A, for instance, the mobile shelf 400 may be positioned within the volume of the frame 102, and, in the illustrated implementation, includes the casters 116 attached to a base 406 of the shelf 400. As illustrated, a frame 402 is mounted to the base 406 and includes or is coupled to a product surface 404. Like the adjustable shelf 300, although the product surface 404 is illustrated as a wire mesh surface, the surface 404 may be a solid or semi-solid surface also.

As shown, a front stop 414 is mounted or attached to the frame 402 near or at a front edge of the shelf 400. The front stop 414, in some aspects, may retain or help retain product on the product surface 404, for example, as the shelf 400 is moved.

At or near a back end of the shelf 400, a back rod 410 is mounted on a coupling 422 that rides on a U-member 424 that is coupled to the frame 402. The coupling 422 is mounted on the U-member 424 adjacent a biasing member 412 (shown covered by a cover 408). The biasing member 412 (e.g., a spring or other potential energy device) exerts a force on the coupling 422 to urge the coupling 422 (and back rod 410) toward a front of the shelf 400 (e.g., toward the front stop 414).

As illustrated in FIG. 4C, the mobile shelf 400 may be installed into the frame 102 by inserting or hooking ends of the back rod 410 into a particular pair of notches 128 of brackets 126 that are connected to the frame. As shown, there may be multiple notches 128 formed in the brackets 126, with each pair of notches 128 corresponding to a particular height of the shelf 400. For example, the casters 116 may be height adjustable, which may adjust a height of the frame 402 of the shelf 400. As the height of the frame 402 is adjusted, a height (e.g., above a floor or other surface) of the back rod 410 is adjusted. Thus, multiple sets of notches 128 may be formed in the brackets 126 to accommodate the different heights of the back rod 410.

In an alternative implementation of the mobile shelf 400, the shelf 400 may not engage with the notches 128 to secure the shelf 400 into the frame 102, but may instead be removeably secured within the frame 102 with a friction fit. For example, there may be leaf spring biasing members attached to the sides of the base 406 that, when the shelf 400 is positioned within the volume, contact the horizontal members 106. The leaf spring biasing members may provide a friction fit of the shelf 400 with the horizontal members 106, thereby securing the shelf 400 within the frame 102 without latching the shelf 400 to the frame 102.

In operation, one or more adjustable shelves 300 may be positioned in and coupled to the frame 102 in one of many positions (e.g., one of many heights and/or one of many angular positions). For example, in one example operation, an adjustable shelf 300 may be installed in the frame 102 by inserting a front rod 308 into the support surfaces 123 formed by the notches 114 of two of the vertical members 104 and the recesses 125 of leg fillers 122 in the two vertical members 104. In some aspects, ends of the front rod 308 may be supported in all or a portion of the support surfaces 123. For instance, each end of the front rod 308 may be supported in about half of the support surface 123, leaving additional space in the support surface for another front rod to be supported (as explained more fully with reference to FIG. 5).

As the front rod 308 is supported in the support surfaces 123, thereby supporting a front portion of the shelf 300, the release rod 310 may be supported into support surfaces 123 formed by the notches 114 of another two of the vertical members 104 and the recesses 125 of leg fillers 122 in the other two vertical members 104. As with the front rod 308, in some aspects, ends of the release rod 310 may be supported in all or a portion of the support surfaces 123. For instance, each end of the release rod 310 may be supported in about half of the support surface 123. Once supported, the biasing members 318 may urge the release rod 310 against the vertical members 104 (e.g., against the leg fillers 122) so as to firmly hold the shelf 300 in the frame 102.

The shelf 300, once installed in the frame 102, may be adjusted so as to change an angle relative to horizontal of the shelf 300. For example, while the front rod 308 is supported at a particular position, the release rod 310 may be adjusted to one of several positions to adjust an angle of the shelf 300 within the frame 102. While the front rod 308 remains supported in particular support surfaces 123, the release rod 310 may be removed from support surfaces 123 by exerting a force on the release rod 310 away from the support surfaces 123. This force counteracts the force of the biasing members 318 and allows the release rod 310 to be removed from the support surfaces 123. The release rod 310 may then be adjusted up or down to change the angle of the shelf 300, and then reinstalled in the frame as described above.

Likewise, an angle of the shelf 300 may be adjusted by adjusting a location of the front rod 308. While the release rod 310 is help in place in the support surfaces 123, the front rod 308 may be disengaged from the support surfaces 123 and a front end of the shelf 300 may be raised or lowered to change an angle of the shelf 300. The front rod 308 may then be reinserted into different support surfaces 123 at the desired angle.

A position of the shelf 300 in the frame (e.g., up or down along a height of the vertical members 104) may also be adjusted. For example, one or both of the front rod 308 and/or release rod 310 may be disengaged from the support surfaces 123 at a particular position and then reengaged with support surfaces 123 at a different position within the frame 102. The other of the front rod 308 and/or release rod 310 may also be disengaged from the support surfaces 123 at a particular position and then reengaged with support surfaces 123 at a different position within the frame 102, thereby changing a position of the shelf 300 within the frame.

In another operation, the mobile shelf 400 may be positioned in and coupled to the frame 102. For example, in one example operation, the shelf 400 may be installed in the frame 102 by rolling or moving the shelf 400 into the volume of the frame 102 until the back rod 410 is adjacent the brackets 126. Ends of the back rod 410 may then be engaged into notches 128 of the brackets 126, as shown in FIG. 4C. In some aspects, the biasing members 412 may urge the back rod 410 against the brackets 128 in order to secure the shelf 400 within the frame 102.

To disengage the shelf 400 from within the frame 102, the back rod 410 may be removed from notches 128 by exerting a force on the back rod 310 away from the brackets 126. This force counteracts the force of the biasing members 412 and allows the back rod 410 to be removed from the brackets 126. The shelf 400 may then be removed from the volume of the frame 102.

Figure 5:
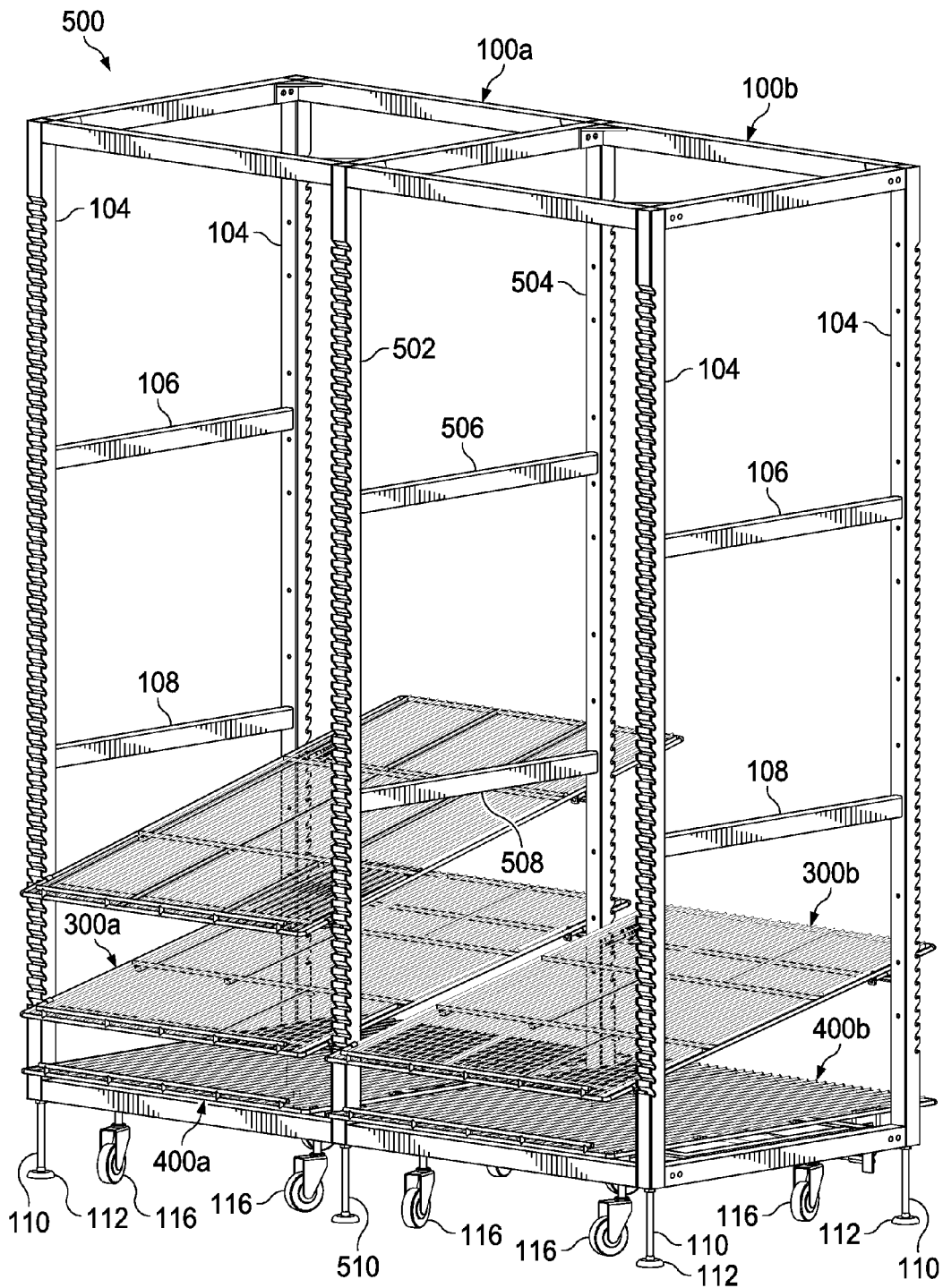
FIG. 5 illustrates an example implementation of a shelving system for supporting and displaying consumer products, including one or more adjustable shelves and one or more mobile support shelves.

FIG. 5 illustrates an example implementation of a shelving system 500 for supporting and displaying consumer products, including one or more adjustable shelves 300 and one or more mobile support shelves 400. As illustrated, the system 500 includes two shelving apparatus 100a and 100b, with each apparatus including a mobile shelf 400a/b and one or more adjustable shelves 300a/b. Although only two apparatus 100a/b are illustrated, the system 500 may include additional shelving apparatus as appropriate.

In the illustrated implementation of the shelving system 500, each shelving apparatus 100a/b may share common vertical members 502/504, as well as, common horizontal members 506/508 and common legs 510. Each vertical member 502/504 may be substantially similar to the vertical members 104 described above, including leg fillers with support surfaces formed by notches of the members 502/504 and recesses of the leg fillers.

As illustrated, adjustable shelves 300a and 300b may share the common vertical members 502/504 and thus be supported at the front and/or the back of the shelves 300a and 300b on the common vertical members 502/504. For instance, front and/or release rods of the shelves 300a and 300b may be supported in a particular support surface of the common vertical members 502/504, as ends of the front and/or release rods of the shelves 300a and 300b may each be supported by about half of the particular support surface as described above. Thus, each shelf 300a and 300b may be positioned side-by-side at similar positions (e.g., similar heights and/or angles), side-by-side at identical positions (e.g., identical heights and/or angles), and/or side-by-side at different positions (e.g., different heights and/or angles), independently of the other of shelf 300a and 300b, as well as other shelves 300 positioned within the same shelving apparatus 100a and/or 100b.

A number of implementations have been described. Nevertheless, it will be understood that various modifications may be made. Accordingly, other implementations are within the scope of the following claims.

What is claimed is:

1. A shelving apparatus, comprising:
a frame structure formed with a plurality of vertical members and a plurality of horizontal members, the plurality of vertical members and plurality of horizontal members defining a volume therebetween, each of the vertical members comprising a plurality of notches formed on a vertical surface of the each vertical member; and
a shelf adjustable between a plurality of positions within the volume and supported, at each position, by the plurality of vertical members, the shelf comprising:
a frame;
a product surface coupled with the frame;
a first rod fixedly and immovably attached to the frame and insertable into at least a portion of a respective notch of the plurality of notches of a first vertical member of the plurality of vertical members, the first rod insertable into the portion of the respective notch of the plurality of notches positioned on a vertical surface of the first vertical member that faces away from the volume defined between the vertical members and the plurality of horizontal members; and
a second rod moveably coupled to the frame and insertable into at least a portion of a respective notch of the plurality of notches of a second vertical member of the plurality of vertical members, the second rod forcibly biased, by a biasing member coupled with the frame, against the second vertical member.

2. The shelving apparatus of claim 1, wherein the frame structure further comprises at least one fill member insertable into a particular vertical member of the plurality of vertical members, the fill member comprising a plurality of recesses that align, when the fill member is inserted into the particular vertical member, with the plurality of notches of the particular vertical member.

3. The shelving apparatus of claim 2, wherein the at least one fill member comprises a plurality of fill members, each of the plurality of fill members insertable into the particular vertical member, and each fill member comprises a plurality of recesses that align, when the each fill member is inserted into the particular vertical member, with the plurality of notches of the particular vertical member.

4. The shelving apparatus of claim 2, wherein the first rod is insertable into at least a portion of a particular recess of the plurality of recesses of the fill member.

5. The shelving apparatus of claim 4, wherein the portion of the particular recess comprises about half of a width of the recess.

6. The shelving apparatus of claim 2, wherein the particular vertical member comprises a plurality of vertical member segments that are coupled together to form the particular vertical member, and
the at least one fill member comprises a plurality of fill member segments, each of the fill member segments coupled to at least one of the plurality of vertical member segments.

7. The shelving apparatus of claim 1, further comprising a plurality of adjustable leg members coupled to the frame; and
a plurality of feet, each foot coupled to a particular adjustable leg member.

8. The shelving apparatus of claim 1, further comprising a mobile shelf that comprises a mobile shelf frame, a mobile shelf product surface coupled to the mobile shelf frame, and a plurality of casters coupled to the mobile shelf frame, the mobile shelf positionable within the volume.

9. The shelving apparatus of claim 1, wherein the product surface is integrally formed with the frame.

10. The shelving apparatus of claim 1, wherein the second rod is forcibly biased, by the biasing member coupled with the frame, against a surface of the second vertical member that faces away from the volume defined between the plurality of vertical members and the plurality of horizontal members.

11. The shelving apparatus of claim 1, wherein the biasing member forcibly biases the second rod toward the first rod.

12. The shelving apparatus of claim 11, wherein the biasing member forcibly biases the second rod in a direction transverse to a length of the second rod.

13. The shelving apparatus of claim 1, wherein the second rod comprises a first end and a second end opposite the first end and the biasing member comprises a first biasing member, the first end insertable into the portion of the respective notch of the second vertical member and forcibly biased, by the first biasing member coupled with the frame, against the second vertical member, the second end insertable into a portion of a respective notch of a third vertical member and forcibly biased, by a second biasing member coupled with the frame, against the third vertical member.

14. The shelving apparatus of claim 1, wherein the first rod is insertable into the portion of the respective notch of the plurality of notches without penetrating the first vertical member.

15. The shelving apparatus of claim 1, wherein each position of the plurality of positions comprises a distinct height of the shelf within the volume, and a distinct angle of the shelf relative to the plurality of vertical members.

16. The shelving apparatus of claim 1, wherein the first rod is removeable from the respective notch based on a force applied to the shelf that adjusts a tension of the biasing member.

17. A shelving system, comprising:
a first frame formed with a plurality of first vertical members and a plurality of first horizontal members, the plurality of first vertical members and plurality of first horizontal members defining a first volume therebetween, each of the first vertical members comprising a plurality of notches formed on a vertical surface of the each first vertical member;
a second frame formed with a plurality of second vertical members and a plurality of second horizontal members, the plurality of second vertical members and plurality of second horizontal members defining a second volume therebetween, each of the second vertical members comprising a plurality of notches formed on a vertical surface of the each second vertical member, where one of the second vertical members and one of the first vertical members comprise a first common vertical member of the first and second frames, and another of the second vertical members and another of the first vertical members comprise a second common vertical member of the first and second frames;
a first shelf adjustable between a plurality of positions within the first volume and supported, at each position, by the plurality of first vertical members, the first shelf comprising:
a first frame;
a first product surface coupled with the first frame;
a first front rod fixedly and immovably attached to the first frame and comprising end portions, each end portion of the first front rod insertable into a portion of a respective notch of the first common vertical member; and
a first rear rod moveably coupled to the first frame and comprising end portions, each end portion of the first rear rod insertable into a portion of a respective notch of the second common vertical member, the first rear rod forcibly biased, by a first biasing member coupled with the first frame, against the second common vertical member; and
a second shelf adjustable between a plurality of positions within the second volume and supported, at each position, by the plurality of second vertical members, the second shelf comprising:
a second frame;
a second product surface coupled with the second frame;
a second front rod fixedly and immovably attached to the second frame and comprising end portions, each end portion of the second front rod insertable into another portion of the respective notch of the first common vertical member; and
a second rear rod moveably coupled to the second frame and comprising end portions, each end portion of the second rear rod insertable into another portion of the respective notch of the second common vertical member, the second rear rod forcibly biased, by a second biasing member coupled with the second frame, against the second common vertical member.

18. The shelving system of claim 17, further comprising a fill member insertable into the first common vertical member, the fill member comprising a plurality of recesses that align, when the fill member is inserted into the first common vertical member, with a plurality of notches of the first common vertical member.

19. The shelving system of claim 18, wherein one of the end portions of the first front rod and one of the end portions of the second front rod are insertable into a particular recess of the plurality of recesses of the fill member.

20. The shelving system of claim 17, wherein each position of the plurality of positions of the first shelf comprises a distinct height of the first shelf within the first volume, and a distinct angle of the first shelf relative to the plurality of first vertical members.

21. The shelving system of claim 20, wherein each position of the plurality of positions of the second shelf comprises a distinct height of the second shelf within the second volume, and a distinct angle of the second shelf relative to the plurality of second vertical members.

22. A shelving apparatus, comprising:
a frame structure formed with a plurality of vertical members and a plurality of horizontal members, the plurality of vertical members and plurality of horizontal members defining a volume therebetween, each of the vertical members comprising a plurality of notches formed on a vertical surface of the each vertical member; and
a shelf adjustable between a plurality of positions within the volume and supported, at each position, by the plurality of vertical members, the shelf comprising:
a frame;
a product surface coupled with the frame;
a first rod fixed to the frame and insertable into at least a portion of a respective notch of the plurality of notches of a first vertical member of the plurality of vertical members; and
a second rod moveably coupled to the frame and insertable into at least a portion of a respective notch of the plurality of notches of a second vertical member of the plurality of vertical members, the second rod forcibly biased, by a first biasing member coupled with the frame, against the second vertical member, the second rod comprising a first end and a second end opposite the first end, the first end insertable into the portion of the respective notch of the second vertical member and forcibly biased, by the first biasing member coupled with the frame, against the second vertical member, the second end insertable into a portion of a respective notch of a third vertical member and forcibly biased, by a second biasing member coupled with the frame, against the third vertical member.

23. A shelving apparatus, comprising:
a frame structure formed with a plurality of vertical members and a plurality of horizontal members, the plurality of vertical members and plurality of horizontal members defining a volume therebetween, each of the vertical members comprising a plurality of notches formed on a vertical surface of the each vertical member; and
a shelf adjustable between a plurality of positions within the volume and supported, at each position, by the plurality of vertical members, the shelf comprising:
a frame;
a product surface coupled with the frame;
a first rod attached to the frame and insertable into at least a portion of a respective notch of the plurality of notches of a first pair of vertical members of the plurality of vertical members; and
a second rod, moveably coupled to the frame, that extends between a second pair of the plurality of vertical members and comprising a first and a second end, each end insertable into a respective notch of each vertical member of the second pair of vertical members, the second rod forcibly biased, by a biasing member coupled with the frame, to hold the frame to the second pair of vertical members.

24. The shelving apparatus of claim 23, further comprising:
a rollable shelf that comprises a plurality of wheels, the rollable shelf engageable with the frame structure within the volume.

25. The shelving apparatus of claim 23, wherein the first pair of vertical members are distinct from the second pair of vertical members in the plurality of vertical members.

26. A shelving apparatus, comprising:
a frame structure formed with a plurality of vertical members and a plurality of horizontal members, the plurality of vertical members and plurality of horizontal members defining a volume therebetween, each of the vertical members comprising a plurality of notches formed on a vertical surface of the each vertical member; and
a shelf adjustable between a plurality of positions within the volume and supported, at each position, by the plurality of vertical members, the shelf comprising:
a frame;
a product surface coupled with the frame;
a first rod fixedly and immovably attached to the frame and insertable into at least a portion of a respective notch of the plurality of notches of a first vertical member of the plurality of vertical members; and
a second rod moveably coupled to the frame and insertable into at least a portion of a respective notch of the plurality of notches of a second vertical member of the plurality of vertical members, the second rod forcibly biased, by a biasing member coupled with the frame, against the second vertical member,
wherein the frame structure comprises at least one fill member insertable into a particular vertical member of the plurality of vertical members, the fill member comprising a plurality of recesses that align, when the fill member is inserted into the particular vertical member, with the plurality of notches of the particular vertical member.

* * * * *